(12) United States Patent
Fredriksson

(10) Patent No.: US 7,467,548 B2
(45) Date of Patent: Dec. 23, 2008

(54) RADAR LEVEL GAUGE SYSTEM AND COUPLING

(75) Inventor: Håkan Fredriksson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 270 days.

(21) Appl. No.: 11/250,252

(22) Filed: Oct. 14, 2005

(65) Prior Publication Data
US 2007/0084281 A1  Apr. 19, 2007

(51) Int. Cl.
*G01F 23/28* (2006.01)
*G01F 23/284* (2006.01)

(52) U.S. Cl. ............. 73/304 R; 73/290 R; 73/290 B; 73/290 V

(58) Field of Classification Search .......... 73/304 R, 73/290 R, 290 B, 290 V
See application file for complete search history.

(56) References Cited

U.S. PATENT DOCUMENTS

| | | | |
|---|---|---|---|
| 3,119,267 A | 1/1964 | Bartky et al. .......... 73/304 |
| 4,198,110 A | 4/1980 | Wetmore et al. ........ 439/321 |
| 4,449,405 A | 5/1984 | Franz et al. ............ 73/304 |
| 4,454,370 A | 6/1984 | Voznick ............... 136/221 |
| 4,499,640 A | 2/1985 | Brenton et al. ......... 29/25.41 |
| 4,551,785 A | 11/1985 | Kroner ............... 361/284 |
| 4,574,328 A | 3/1986 | Maier ................ 361/284 |
| 4,628,392 A | 12/1986 | Didier ................ 361/2 |
| 4,926,695 A | 5/1990 | Kleven et al. ........ 73/861.24 |
| 5,136,299 A * | 8/1992 | Edvardsson .......... 342/124 |
| 5,391,839 A | 2/1995 | Lang et al. ............. 174/65 |
| 5,410,104 A | 4/1995 | Gretz et al. ............ 174/65 |
| 5,440,455 A | 8/1995 | Rottmar .............. 361/809 |
| 5,481,197 A * | 1/1996 | Sanders et al. ........ 324/690 |
| 5,507,181 A * | 4/1996 | Fox et al. ............ 73/290 V |
| 5,661,251 A | 8/1997 | Cummings et al. ....... 73/866.5 |
| 5,703,289 A * | 12/1997 | Mulrooney ............ 73/290 V |
| 5,781,019 A | 7/1998 | Telder ................ 324/643 |
| 5,827,985 A | 10/1998 | Grieger et al. ......... 73/866.5 |

(Continued)

FOREIGN PATENT DOCUMENTS

DE  3 337 481 A1  4/1985

(Continued)

OTHER PUBLICATIONS

International Search Report, PCT/SE2006/001156, filed Oct. 13, 2006, 4 pages.

(Continued)

*Primary Examiner*—David A. Rogers
(74) *Attorney, Agent, or Firm*—Westman, Champlin & Kelly, P.A.

(57) ABSTRACT

A radar level gauge system for measuring a filling level of a content contained in a tank is disclosed. The system comprises a transmitter and a probe, configured to guide transmitted microwave energy towards the content. Further, it comprises a coupling comprising a mechanical connection configured to mechanically connect the probe to the tank; an electric feed-through configured to electrically connect the probe to the transmitter; and a seal adapted to hermetically seal the electric feed-through, wherein the coupling is adapted to provide mechanical separation between said mechanical connection and said seal, and to permit at least some movement between the mechanical connection and the seal, thereby protecting the seal from forces acting on the probe.

26 Claims, 3 Drawing Sheets

U.S. PATENT DOCUMENTS

| | | | | |
|---|---|---|---|---|
| 5,851,083 | A | 12/1998 | Palan | 403/337 |
| 5,877,663 | A | 3/1999 | Palan et al. | 333/252 |
| 5,943,908 | A | 8/1999 | Innes et al. | 73/290 |
| 5,955,684 | A * | 9/1999 | Gravel et al. | 73/866.5 |
| 6,019,007 | A | 2/2000 | Grieger et al. | 73/866.5 |
| 6,148,681 | A | 11/2000 | Gravel et al. | 73/866.5 |
| 6,178,817 | B1 * | 1/2001 | Hewelt et al. | 73/290 V |
| 6,247,362 | B1 | 6/2001 | Soroka | 73/290 |
| 6,276,199 | B1 * | 8/2001 | Eckert et al. | 73/290 V |
| 6,292,131 | B1 * | 9/2001 | Wilke et al. | 342/124 |
| 6,386,055 | B1 | 5/2002 | Eason | 73/866.5 |
| 6,393,909 | B1 * | 5/2002 | Fahrenbach et al. | 73/290 V |
| 6,412,344 | B1 | 7/2002 | Danicich et al. | 73/290 |
| 6,417,748 | B1 * | 7/2002 | Lopatin et al. | 333/252 |
| 6,445,192 | B1 * | 9/2002 | Lovegren et al. | 324/644 |
| 6,499,346 | B1 * | 12/2002 | Wien et al. | 73/290 R |
| 6,538,598 | B1 * | 3/2003 | Wilkie et al. | 342/124 |
| 6,553,830 | B2 * | 4/2003 | Fahrenbach et al. | 73/290 V |
| 6,606,904 | B2 * | 8/2003 | Muller et al. | 73/290 V |
| 6,614,391 | B1 * | 9/2003 | Burger et al. | 342/124 |
| 6,628,229 | B1 * | 9/2003 | Johnson et al. | 342/124 |
| 6,634,228 | B2 * | 10/2003 | Deserno et al. | 73/290 V |
| 6,642,807 | B1 | 11/2003 | Gard | 333/24 |
| 6,672,155 | B2 * | 1/2004 | Muller et al. | 73/290 V |
| 6,679,115 | B2 * | 1/2004 | Heidecke | 73/290 V |
| 6,681,626 | B2 * | 1/2004 | Funfgeld | 73/290 V |
| 6,802,219 | B2 * | 10/2004 | Joseph et al. | 73/290 R |
| 6,820,510 | B2 * | 11/2004 | Schroth et al. | 73/866.5 |
| 6,829,932 | B2 * | 12/2004 | Laun et al. | 73/290 V |
| 6,834,546 | B2 * | 12/2004 | Edvardsson | 73/290 V |
| 6,856,142 | B2 * | 2/2005 | Schroth et al. | 324/644 |
| 6,859,166 | B2 * | 2/2005 | Edvardsson | 342/124 |
| 6,867,729 | B2 * | 3/2005 | Berry et al. | 342/124 |
| 6,915,689 | B2 * | 7/2005 | Edvardsson | 73/290 V |
| 6,917,326 | B1 * | 7/2005 | Tregenza et al. | 342/124 |
| 6,928,866 | B2 * | 8/2005 | Michalski et al. | 73/290 R |
| 6,950,055 | B2 * | 9/2005 | Edvardsson et al. | 342/124 |
| 7,046,189 | B2 * | 5/2006 | Spanke et al. | 342/124 |
| 7,073,379 | B2 * | 7/2006 | Schroth et al. | 73/290 V |
| 7,075,480 | B2 * | 7/2006 | Fehrenbach et al. | 342/124 |
| 7,095,365 | B2 * | 8/2006 | Klofer et al. | 342/124 |
| 7,134,315 | B1 * | 11/2006 | Stigler et al. | 73/290 V |
| 7,196,971 | B2 * | 3/2007 | Trafford | 367/176 |
| 7,204,140 | B2 * | 4/2007 | Kallsand et al. | 73/290 R |
| 7,243,539 | B2 * | 7/2007 | Otto et al. | 73/290 V |
| 7,255,002 | B2 * | 8/2007 | Gravel et al. | 73/290 V |
| 7,283,086 | B2 * | 10/2007 | Feisst et al. | 342/124 |
| 7,284,425 | B2 * | 10/2007 | Wennerberg et al. | 73/290 V |
| 7,319,401 | B2 * | 1/2008 | Akerstrom et al. | 340/612 |
| 7,322,233 | B2 * | 1/2008 | Fehrenbach et al. | 73/290 V |
| 7,328,611 | B2 * | 2/2008 | Klees et al. | 73/290 V |
| 2002/0084931 | A1 | 7/2002 | Bletz | 342/124 |
| 2002/0124658 | A1 * | 9/2002 | Schmidt | 73/856 |
| 2003/0118832 | A1 | 6/2003 | Skaling et al. | 428/412 |
| 2003/0201842 | A1 | 10/2003 | Gard | 333/24 |
| 2005/0150568 | A1 | 7/2005 | Dietmeier | 141/95 |

FOREIGN PATENT DOCUMENTS

| | | |
|---|---|---|
| EP | 0 780 664 | 6/1997 |
| GB | 2 045 433 | 10/1980 |

OTHER PUBLICATIONS

"Saab TankRadar® Rex", High Precision Tank Gauging System, Technical Description, Copyright © Sep. 2001 by Saab Marine Electronics AB. First Edition. Sep. 2001 Ref. No. 703010E. pp. 1-19.

"Is Your Equipment Designed and Installed Safely?", InTech, pp. 40-43, (Jun. 1996).

"Level Measurement Solutions", Fisher-Rosemount, Managing the Process Better, 15 pages (1995).

* cited by examiner

RADAR LEVEL GAUGE SYSTEM AND COUPLING

TECHNICAL FIELD OF THE INVENTION

The present invention relates to a radar level gauge system for measuring a filling level of a content contained in a tank.

The invention further relates to a coupling, for transmitting signals between an inside and an outside of a tank via at least one transmission line.

TECHNICAL BACKGROUND

Radar level gauge systems are in wide use for measuring filling levels of tanks or containers. Radar level gauging is generally performed either as non-contact measurement wherein microwave energy is radiated towards a content of the tank, or as contact measurement wherein microwave energy is guided towards and into the content by a waveguiding probe.

This probe may be subjected to substantial forces due to movements in the content of the tank resulting from, for example, filling, emptying, stirring etc.

Furthermore, since radar level gauges frequently operate in environments with high pressure differences between an inside and an outside of a tank, a feed-through for sending signals between the inside and the outside of the tank should preferably be hermetically sealed.

In order to be able to use a radar level gauge system of the contact type over a wide temperature and/or pressure range, temperature stable and pressure-durable sealing materials are needed. Such materials, for example various types of glass and ceramics, are often brittle and may be damaged through forces acting on the probe.

In U.S. Pat. No. 6,019,007, a radar level gauge system of the contact type is disclosed, wherein sealing is provided through tightly pressing sealing materials between electrical and mechanical elements of the system. When forces act on the probe, these are thus directly transmitted to the scaling materials.

Since the above-mentioned type of sealing materials, typically various glasses and/or ceramics, generally are sensitive to other forces than compression, the sealing method disclosed in U.S. Pat. No. 6,019,007 would appear to practically prohibit use of these sealing materials.

There is thus a need for a more robust radar level gauging system, for example enabling the use of the above-mentioned type of sealing materials.

OBJECTS OF THE INVENTION

In view of the above-mentioned and other drawbacks of the prior art, a general object of the present invention is to provide an improved radar level gauge system as well as an improved coupling for transmitting signals between an inside and an outside of a tank via at least one transmission line.

A further object of the present invention is to enable use of temperature stable and pressure-durable sealing materials, such as various types of glass and/or ceramics.

SUMMARY OF THE INVENTION

According to a first aspect of the invention, these and other objects are achieved through a radar level gauge system, for measuring a filling level of a content contained in a tank, the radar level gauge system comprising a transmitter arranged outside the tank and configured to transmit microwave energy, a probe at least partly disposed inside the tank and configured to guide transmitted microwave energy towards the content, a receiver arranged outside the tank and configured to receive reflected microwave energy, and a coupling configured to mechanically attach the probe to the tank, provide an electric feed-through between the probe and the transmitter and receiver, and hermetically seal the tank, wherein the coupling comprises a mechanical connection configured to mechanically connect the probe to the tank, an electric feed-through configured to electrically connect the probe to the transmitter and receiver, and a seal adapted to hermetically seal the electric feed-through, wherein the coupling is adapted to provide mechanical separation between the mechanical connection and the seal, and to permit some movement between the mechanical connection and the seal, thereby protecting the seal from forces acting on the probe.

In the context of the present application, the "probe" is a waveguide designed for guiding microwaves into the content contained in the tank. Several types of probes, for example single-line (Goubau-type), twin-line and coaxial probes may be used. The probes may be essentially rigid or flexible and they may be made from metal, such as stainless steel, plastic, such as PTFE, or a combination thereof.

By "hermetically seal" should be understood to seal in a gas-tight and pressure-resistant fashion.

Through this mechanical separation between the mechanical connection and the seal, essentially no forces acting on the probe are transmitted to the seal. The present invention thus enables the use of sealing materials, which are very advantageous from a temperature stability and pressure durability point-of-view, but sensitive to other forces than pure compression, including, for example, various glasses and ceramics.

The ability to use such sealing materials further enables widening a field of use of the radar level gauging system to more challenging environments, such as environments involving large variations in temperature and pressure.

According to one embodiment of the invention, the coupling comprised in the radar level gauge system according to the present invention may further comprise a connecting member configured to be mechanically attached to the tank, the connecting member comprising a first clamping surface, and the above-mentioned seal, wherein the mechanical connection may be provided through clamping of the probe between the first clamping surface and a second clamping surface, the second clamping surface being mechanically connected to the tank, when the connecting member is mechanically attached to the tank.

This clamping of the probe between the first and second clamping surfaces may take place directly or indirectly. In the case of indirect clamping, an intermediate construction may be implemented in order to, for example, modify clamping force directions.

According to this embodiment, mechanical separation between the mechanical connection and the seal is accomplished through providing the mechanical connection by clamping the probe between first and second clamping surfaces, wherein the first clamping surface is mechanically separated from the seal.

Forces acting on the probe will thereby be absorbed at the clamping surfaces and essentially not transmitted to the seal.

The coupling may further comprise at least one resilient member arranged between the probe and at least one of the clamping surfaces. Such a resilient member may thus be arranged between the first clamping surface and the probe, between the second clamping surface and the probe, or at both these locations.

Through the inclusion of at least one such resilient member, the forces acting between the probe and at least one of the clamping surfaces may be more evenly distributed.

The at least one resilient member may, furthermore, alleviate the effects of various parts comprised in the coupling potentially having different coefficients of thermal expansion, such that clamping forces may be substantially maintained over varying temperatures.

The resilient member may, for example, be one or several interacting springs, such as spring washer(s). The clamping of the probe may be performed such that clamping forces act essentially radially on the probe.

As stated above, this radial clamping may take place either directly or indirectly. In the case of indirect clamping, axially directed forces exerted by the first and/or second clamping surfaces may be converted into radially directed forces through a suitable force converting arrangement.

Alternatively, the probe may comprise a radially extending portion, and the clamping of the probe may be performed such that clamping forces act essentially axially on this radially extending portion, through clamping of the radially extending portion between the first and second clamping surfaces.

This radially extending portion may be an integral part of the probe or an additional part having been attached to the probe in order to enable clamping of the probe in the axial direction.

An additional effect of providing the probe with such a radially extending portion is that the probe, in the event of a failure in the mechanical connection, may be prevented from falling into the tank and potentially causing a disruption in production and/or damage to the tank.

The coupling may further comprise at least one dielectric member, the at least one dielectric member being arranged between the probe and at least one of the first and second clamping surfaces.

This at least one dielectric member may advantageously be configured to provide electric insulation between the probe and the tank, at least partly absorb forces acting on the probe, and provide temperature stability.

For optimal transmission of microwave signals through the probe, the probe should preferably be electrically isolated from the tank. Furthermore, the very large loads which may have to be carried by the mechanical connection should preferably be absorbed to a sufficient degree. The effects of expansion and contraction of materials due to temperature variation over a very wide range are also advantageously addressed.

All of these needs may be met by arranging at least one suitably configured dielectric member in the manner described above.

Preferably, the at least one dielectric member may be made of a crystalline or amorphous material, such as a ceramic or glass. Suitable materials, for example, include $Al_2O_3$ and $SiO_2$.

Furthermore, the coupling comprised in the radar level gauge system according to the present invention may comprise a force distributing member, the force distributing member being arranged to distribute force acting on at least one of the dielectric members, thereby reducing an occurrence of point-load on this at least one dielectric member.

In addition to distributing force such that the occurrence of point-load is reduced, the force distributing member may reduce stress induced by differences in coefficients of thermal expansion of various components comprised in the coupling.

The force distributing member may advantageously be provided as a plastic sleeve arranged to enclose the at least one dielectric member. Suitable plastic materials for example include PTFE.

According to another embodiment of the present invention, the connecting member may be configured to be mechanically attached to the tank via a probe-supporting member, which is configured to be mechanically attached to the tank and to support the probe in an axial direction, wherein the second clamping surface is provided on the probe-supporting member.

For attaching the probe to the tank, it may be desirable to use this type of probe-supporting member. This is especially the case for standardized openings or already existing openings in a tank. In the latter case, dimensions of the probe supporting member may be adapted to the tank opening, thereby enabling use of a standardized connecting member. This will be beneficial to installation costs.

According to a further embodiment of the radar level gauge system according to the present invention, the electric feed-through may comprise at least two conductors being connected by an electrically conductive flexible member adapted to absorb movement resulting from forces acting on the probe.

The electrically conductive flexible member may be arranged on either conductor or provided as a separate part.

Although the mechanical connection through the present invention is mechanically separated from the seal, forces acting on the probe may lead to larger than negligible movement of the probe. By including an electrically conductive flexible member in the electric feed-through, movement of the probe may be absorbed by this flexible member, thereby ensuring that very small forces only are transmitted to the seal by the electric feed-through.

This electrically conductive flexible member may preferably comprise a resilient member, such as a spring-loaded connector. However, several other options exist, such as forming the electrically conductive flexible member using an "soft" metal conductor. This soft conductor may be a deformable metal wire or band. The metal wire or band may provided such that it can be deformed through stretching, or such that it is longer than is needed to bridge the gap between the connected conductors. In the latter case, the shape of the wire or band would change in accordance with relative movement between the probe and the seal.

According to yet another embodiment of the first aspect of the present invention, the seal may extend axially through the connecting member, and the electric feed-through may extend axially through the seal.

According to a second aspect of the invention, the above-discussed and other objects are achieved by a coupling, for transmitting signals between an inside and an outside of a tank via at least one transmission line, the coupling comprising a mechanical connection configured to mechanically connect the transmission line to the tank, an electric connection configured to electrically connect the transmission line to an external connector, and a seal adapted to hermetically seal the electric connection, wherein the coupling is adapted to provide mechanical separation between the mechanical connection and the seal, thereby isolating the seal from forces acting on the transmission line.

By "transmission line" should, in the context of the present application, be understood any line capable of transmitting signals and/or electric power. Examples of transmission lines thus include probes for use in a radar level gauge system and connecting lines for transmitting power to and signals from various sensing devices, such as sensors for sensing temperature, pressure, pH, flow, viscosity etc, inside a tank to an external connector. To this external connector, measurement acquisition and/or processing equipment positioned outside the tank may be connected.

Effects obtained through this second aspect of the present invention are largely analogous to those described above in connection with the first aspect of the invention.

BRIEF DESCRIPTION OF THE DRAWINGS

These and other aspects of the present invention will now by way of example be described in more detail, with reference to the appended drawings showing currently preferred embodiments of the invention. On the drawings:

FIG. 3b is a schematic exploded view of the coupling in FIG. 3a.

FIG. 3c is a schematic cross-section view of a seal comprised in the coupling in FIG. 3a.

DETAILED DESCRIPTION OF PREFERRED EMBODIMENTS OF THE INVENTION

In the following description, the present invention is described with reference to a radar level gauge system and a coupling comprised in a radar level gauge system. It should be noted that this by no means limits the scope of the coupling according to the invention, which is equally applicable to many tank-related sensing systems, for example for coupling sensing devices inside a tank, such as sensors for temperature, pressure, flow, pH, viscosity etc to acquisition and/or processing equipment positioned outside the tank.

Figure 1:
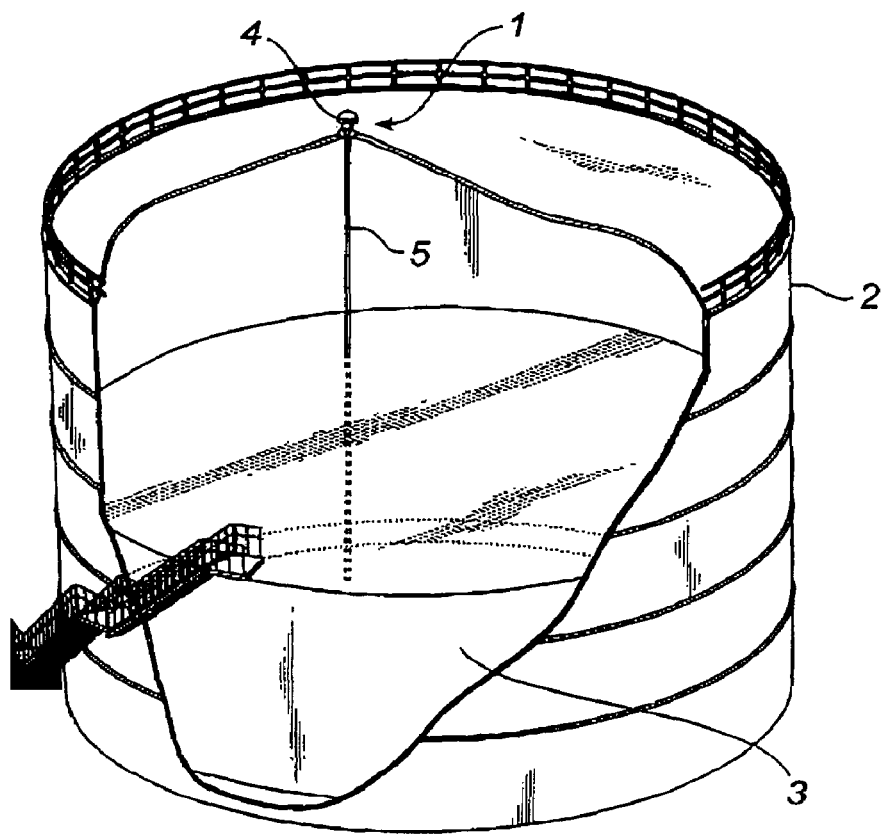
FIG. 1 schematically illustrates an application example for a contact-type radar level gauge system.

In FIG. 1, an application example for a contact-type radar level gauge system is schematically illustrated, wherein a radar level gauge 1 system is arranged on a tank 2 containing a content 3. The radar level gauge system has a transmitter/receiver unit 4 arranged outside the tank 2 and a probe 5 disposed inside the tank 2 and arranged to guide microwaves transmitted by the transmitter/receiver unit 4 into the content 3 contained in the tank 2.

Figure 2:
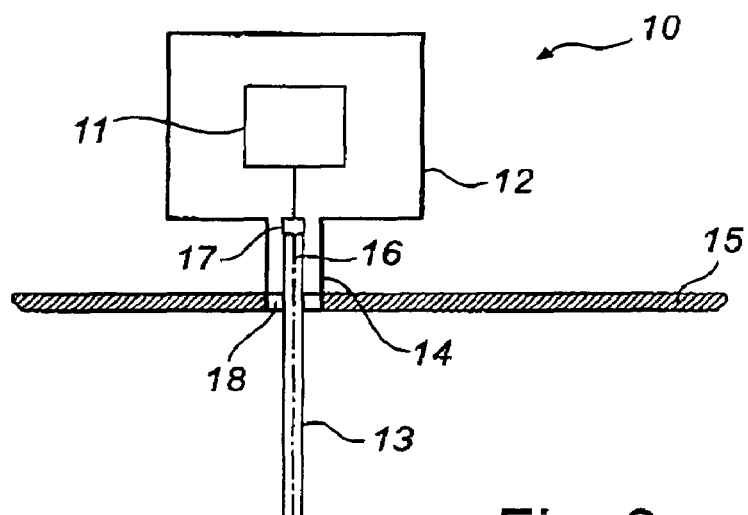
FIG. 2 is a schematic illustration of an examplary radar level gauge system according to the present invention.

In FIG. 2, an exemplary radar level gauge system 10 according to the present invention is schematically illustrated. Here, a microwave transceiver device 11 is enclosed in a housing 12 and electrically connected to a probe 13 through a coupling 14. Through the coupling 14, the probe 13 is also mechanically attached to a tank 15. The electric connection between the microwave transceiver 11 and the probe 13 is accomplished through an electric feed-through 16. The electric feed-through is hermetically sealed by a seal 17 and the probe 13 is mechanically attached to the tank 15 through a mechanical connection 18, which is configured to be mechanically separated from the seal 17.

With reference to FIGS. 3a-c and FIG. 4, two embodiments of the coupling according to the present invention will be described in more detail.

Figure 3A:
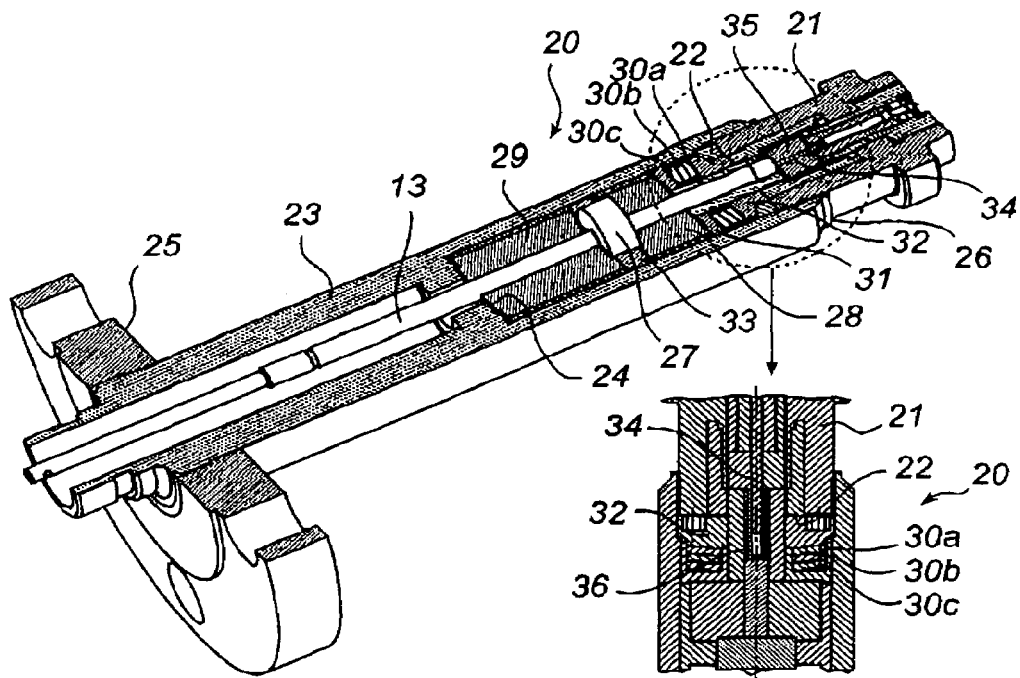
FIG. 3a is a schematic cross-section view of a first embodiment of a coupling according to the present invention.

In FIG. 3a, a first embodiment of the coupling according to the present invention is shown. Here, a coupling 20 is shown as not being attached to the tank 15. It should be understood that the coupling as shown can be sealingly attached to the tank in a number of ways known to one skilled in the art.

The examplary coupling 20 has a connecting member in the form of an upper metal sleeve 21 with a first clamping surface 22, and a probe-supporting member in the form of a lower metal sleeve 23 with a second clamping surface 24. At its bottom end, the lower metal sleeve is welded to a metal flange 25 for facilitating connection of the coupling 20 with the tank 15.

In FIG. 3a the upper metal sleeve 21 is shown as being attached to the lower metal sleeve 23 through a screw-connection 26 which has been welded so that it is hermetically tight. Through this screw-connection 26, a radially extending portion of the probe 13, here in the form of a cylindrical extension 27 has been mechanically connected to the coupling 20 through clamping between the first and second clamping surfaces 22, 24, via dielectric members in the form of first and second ceramic spools 28, 29 and a resilient member in the form of a set of spring washers 30a-c enclosed by a housing 31 and a lid 32. The ceramic spools and the probe 13 are enclosed by a force-distributing member in the form of a PTFE-sleeve 33. Through the spring washer set 30a-c, the clamping forces are more evenly distributed and are substantially maintained over varying temperatures.

In addition to the above-described mechanical connection, the coupling 20 also accomplishes a hermetically sealed electric feed-through between the inside and the outside of the tank 15, when the coupling is mounted to the tank. This electric feed-through is, according to the present exemplary embodiment, constituted by a first pin 34 extending through a seal 35 which extends axially through the upper metal sleeve 21, the probe 13, and a flexible electrically conductive member in the form of a spring pin 36, which is arranged to electrically connect the first pin 34 and the probe 13.

Figure 3B:
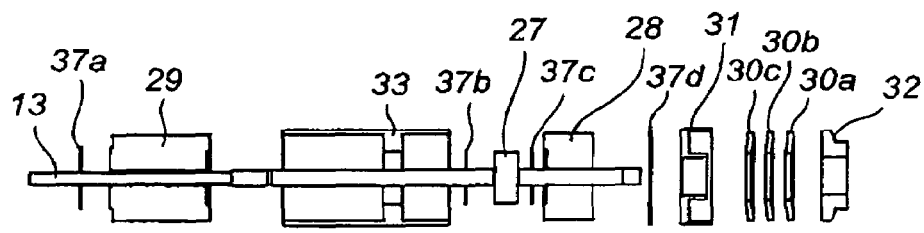

FIG. 3b, is an exploded view the coupling in FIG. 3a.

In FIG. 3b, parts described in connection with FIG. 3a are shown more clearly. In addition, a number of graphite disks 37a-d are shown. These disks 37a-d serve to distribute clamping forces more evenly over the ceramic spools 28, 29, such that the occurrence of point-loads is further reduced.

Figure 3C:
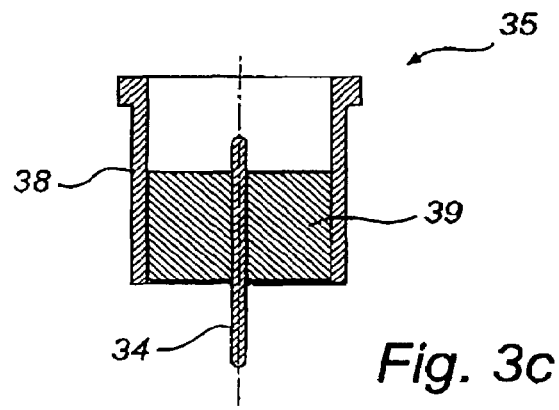

FIG. 3c is a schematic cross-section view of the seal 35 in FIG. 3a. Referring to FIG. 3c, the seal 35 comprises a metal sleeve 38, a ceramic or glass plug 39 and a through-going pin 34. In the case of the plug 39 being ceramic, the first pin 34 is preferably inserted in a hole in the plug 39 and then soldered to the plug 39 to hermetically seal the lead-through. The ceramic plug 39 is inserted in the sleeve and then soldered to the sleeve 38 to hermetically seal the interface between plug 39 and sleeve 38. Alternatively, the connection between the ceramic plug 39 and the metal sleeve 38 may be achieved through press-fit. In the case of a glass plug 39, the plug can be formed by allowing molten glass to solidify inside the sleeve 38 together with the first pin 34. Following mounting of the seal 35 in the upper metal sleeve 21, the metal sleeve 38 of the seal 35 is welded to the upper metal sleeve 21 in order to hermetically seal the interface between the upper metal sleeve 21 and the seal 35.

Through the seal 35 with its integrated first pin 34, a part of a hermetically sealed electric feed-through has been formed. From above, this pin 34 can be contacted by a connector (not shown), which can be connected with a microwave transmitter and receiver 11, and from below, the pin is connected with the spring pin 36 which in turn is connected to the probe 13.

Depending on the content in the tank, additional sealing elements (not shown) may suitably be added in order to, to a certain degree, prevent tank content from penetrating into the coupling. This may be useful, for example, to prevent corrosion.

Figure 4:
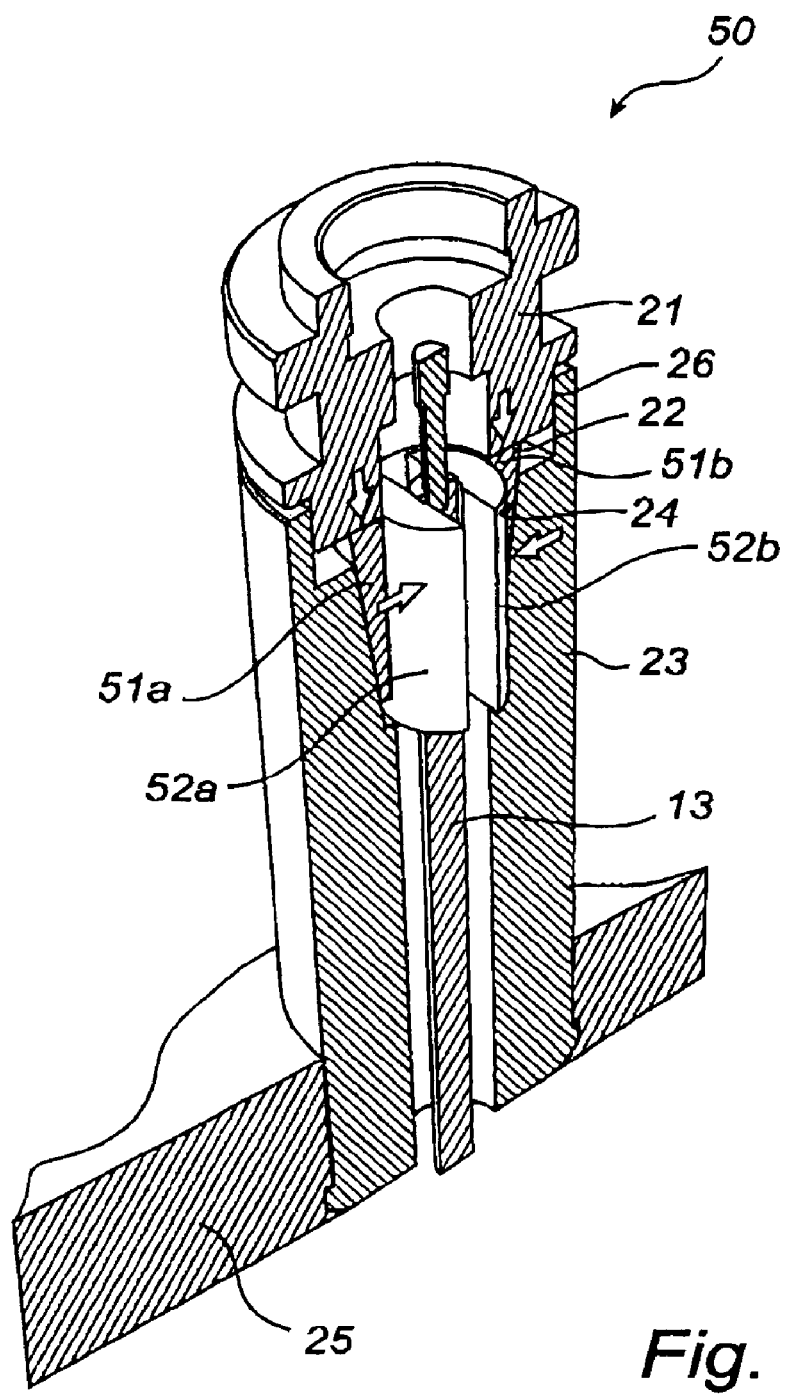
FIG. 4 is a schematic cross-section view of a second embodiment of a coupling according to the present invention.

In FIG. 4 a cross-section of a coupling 50 according to a second embodiment of the present invention is schematically shown.

The main difference between the coupling 20 in FIG. 3a and the coupling 50 in FIG. 4 is that clamping forces act essentially radially on the probe 13 in the coupling 50 of FIG. 4.

As described in connection with FIGS. 3a-c, the coupling 50 of FIG. 4 has a connecting member in the form of an upper metal sleeve 21 with a first clamping surface 22, and a probe-supporting member in the form of a lower metal sleeve 23 with a second clamping surface 24. At its bottom end, the lower metal sleeve is welded to a metal flange 25 for facilitating connection of the coupling with the tank 15.

In FIG. 4 the upper metal sleeve 21 is shown as being attached to the lower metal sleeve 23 through a screw-connection 26 which has been welded so that it is hermetically tight. Through this screw-connection 26, clamping forces are, via wedges 51a-b and ceramic sleeve segments 52a-b, applied essentially radially on the probe 13.

The person skilled in the art realizes that the present invention by no means is limited to the preferred embodiments described above. On the contrary, many modifications and variations are possible within the scope of the appended claims. For example, the coupling according to the invention can be used for various other sensing systems, such as systems for sensing flow, temperature, pH, and other relevant process and product parameters. The hermetically sealed electric feed-through may further be radially oriented as well as axially. Furthermore, other types of mechanical connections may be implemented, such as clamping radially using a connecting member which may be attached to a probe-supporting member in the radial direction rather than in the axial direction. Moreover, other types of sealing configurations may be used. For example, sealing may be achieved by pressing two surfaces against each other, while keeping this seal mechanically separated from the mechanical connection.

What is claimed is:

1. A radar level gauge system, for measuring a filling level of a content contained in a tank, said radar level gauge system comprising:
    a transmitter arranged outside said tank and configured to transmit microwave energy;
    a probe at least partly disposed inside said tank and configured to guide transmitted microwave energy toward said content;
    a receiver arranged outside said tank and configured to receive reflected microwave energy; and
    a coupling configured to:
        mechanically attach said probe to said tank;
        provide an electric feed-through between said probe and said transmitter and receiver; and
        hermetically seal said tank,
    wherein said coupling comprises:
    a mechanical connection configured to mechanically connect said probe to said tank;
    an electric feed-through configured to electrically connect said probe to said transmitter and receiver; and
    a seal adapted to hermetically seal said electric feed-through,
    wherein said coupling is adapted to provide mechanical separation between said mechanical connection and said seal, and to permit at least some movement between said mechanical connection and said seal, thereby protecting said seal from forces acting on said probe; and
    wherein said electric feed-through comprises at least two conductors being connected by an electrically conductive flexible member adapted to absorb movement resulting from forces acting on said probe.

2. The radar level gauge system according to claim 1, wherein said coupling comprises a connecting member configured to be mechanically attached to said tank, said connecting member comprising:
    a first clamping surface; and
    said seal, and
    wherein said mechanical connection is provided through clamping of said probe between said first clamping surface and a second clamping surface, said second clamping surface being mechanically connected to said tank, when said connecting member is mechanically attached to said tank.

3. The radar level gauge system according to claim 2, wherein said coupling further comprises at least one resilient member, said at least one resilient member being arranged between said probe and at least one of said clamping surfaces.

4. The radar level gauge system according to claim 2, wherein said clamping of said probe is performed such that clamping forces act essentially radially on said probe.

5. The radar level gauge system according to claim 2, wherein:
    said probe comprises a radially extending portion; and
        said clamping of said probe is performed such that clamping forces act essentially axially on said radially extending portion, through clamping of said radially extending portion between said first and second clamping surfaces.

6. The radar level gauge system according to claim 2, wherein said connecting member is configured to be mechanically attached to said tank via a probe-supporting member, said probe-supporting member being configured to:
    be mechanically attached to said tank; and
    support said probe in an axial direction, and wherein said second clamping surface is provided on said probe-supporting member.

7. The radar level gauge system according to claim 1, wherein said electrically conductive flexible member comprises a spring-loaded connector.

8. The radar level gauge system according to claim 2, wherein:
    said seal extends axially through said connecting member; and
    said electric feed-through extends axially through said seal.

9. The radar level gauge system according to claim 2, wherein said coupling further comprises at least one dielectric member, said at least one dielectric member being arranged between said probe and at least one of said first and second clamping surfaces.

10. The radar level gauge system according to claim 9, wherein said at least one dielectric member is configured to:
    provide electric insulation between said probe and said tank;
    at least partly absorb forces acting on said probe; and
    provide temperature stability.

11. The radar level gauge system according to claim 9, wherein said dielectric member is made of a crystalline or amorphous material.

12. The radar level gauge system according to claim 9, wherein said coupling further comprises a force distributing member, said force distributing member being arranged to distribute force acting on at least one of said dielectric members, thereby reducing an occurrence of point-load on said dielectric member.

13. The radar level gauge system according to claim 12, wherein said force distributing member is provided as a plastic sleeve arranged to enclose said at least one dielectric member.

14. A coupling, for transmitting signals between an inside and an outside of a tank via at least one transmission line, said coupling comprising:
a mechanical connection configured to mechanically connect said transmission line to said tank;
an electric connection configured to electrically connect said transmission line to an external connector; and
a seal adapted to hermetically seal said electric connection,
wherein said coupling is adapted to provide mechanical separation between said mechanical connection and said seal, and to permit at least some movement between said mechanical connection and said seal, thereby isolating said seal from forces acting on said transmission line; and
wherein said electric feed-through comprises at least two conductors being connected by an electrically conductive flexible member adapted to absorb movement resulting from forces acting on said transmission line.

15. The coupling according to claim 14, said coupling further comprising a connecting member configured to be mechanically attached to said tank, said connecting member comprising:
a first clamping surface; and
said seal,
wherein said mechanical connection is provided through clamping of said transmission line between said first clamping surface and a second clamping surface, said second clamping surface being mechanically connected to said tank, when said connecting member is mechanically attached to said tank.

16. The coupling according to claim 15, further comprising at least one resilient member, said at least one resilient member being arranged between said transmission line and at least one of said clamping surfaces.

17. The coupling according to claim 15, wherein said clamping of said transmission line is performed such that clamping forces act essentially radially on said transmission line.

18. The coupling according to claim 15, wherein:
said transmission line comprises a radially extending portion; and
said clamping of said transmission line is performed such that clamping forces act essentially axially on said radially extending portion, through clamping of said radially extending portion between said first and second clamping surfaces.

19. The coupling according to claim 15, wherein said connecting member is configured to be mechanically attached to said tank via a transmission line-supporting member, said transmission line-supporting member being configured to:
be mechanically attached to said tank; and
support said transmission line in an axial direction, and wherein said second clamping surface is provided on said transmission line-supporting member.

20. The coupling according to claim 14, wherein said electrically conductive flexible material comprises a spring-loaded connector.

21. The coupling according to claim 15, wherein:
said seal extends axially through said connecting member; and
said electric feed-through extends axially through said seal.

22. The coupling according to claim 15, wherein said coupling further comprises at least one dielectric member, said at least one dielectric member being arranged between said transmission line and at least one of said first and second clamping surfaces.

23. The coupling according to claim 22, wherein said at least one dielectric member is configured to:
provide electric insulation between said transmission line and said tank;
at least partly absorb forces acting on said transmission line; and
provide temperature stability.

24. The coupling according to claim 22, wherein said dielectric member is made of a crystalline or amorphous material.

25. The coupling according to claim 22, wherein said coupling further comprises a force distributing member, said force distributing member being arranged to distribute force acting on at least one of said dielectric members, thereby reducing an occurrence of point-load on said dielectric member.

26. The coupling according to claim 25, wherein said force distributing member is provided as a plastic sleeve arranged to enclose said at least one dielectric member.

* * * * *